United States Patent [19]

Hahnfeld et al.

[11] Patent Number: 4,717,741

[45] Date of Patent: Jan. 5, 1988

[54] RUBBER MODIFIED STYRENIC POLYMER COMPOSITIONS FORMED FROM HYDROPEROXIDE DERIVATIVES OF RUBBERY POLYMERS

[75] Inventors: Jerry L. Hahnfeld; Alan E. Platt; David A. Habermann, all of Midland, Mich.

[73] Assignee: The Dow Chemical Company, Midland, Mich.

[21] Appl. No.: 734,622

[22] Filed: May 16, 1985

[51] Int. Cl.$^4$ .................................................. C08J 3/28
[52] U.S. Cl. ............................ 522/116; 522/124; 522/129; 525/75; 525/86
[58] Field of Search ................ 522/116, 124, 129; 525/75, 86

[56] References Cited

U.S. PATENT DOCUMENTS

| | | | |
|---|---|---|---|
| 2,911,398 | 11/1959 | Vandenbert | 525/333.3 |
| 2,972,605 | 2/1961 | Natta et al. | 525/333.3 |
| 3,081,242 | 3/1963 | Smith et al. | 522/129 |
| 3,115,418 | 12/1963 | Magat et al. | 522/124 |
| 3,252,880 | 5/1966 | Magat et al. | 522/124 |
| 3,271,477 | 9/1966 | Kresge | 525/389 |
| 3,322,661 | 5/1967 | Yoshikawa et al. | 522/116 |
| 3,484,353 | 12/1969 | Sharp | 522/129 |
| 3,846,266 | 11/1974 | Duynstee et al. | 522/122 |
| 3,925,076 | 12/1975 | Helmsch et al. | 522/129 |

*Primary Examiner*—Allan M. Lieberman

[57] ABSTRACT

A rubber-modified polymeric composition is disclosed. The rubber-modifying component comprises a grafted rubbery polymer, said grafted rubbery polymer being formed by a process, the steps of the process involving the formation of a hydroperoxidized rubbery polymer intermediate.

12 Claims, 1 Drawing Figure

RUBBER MODIFIED STYRENIC POLYMER COMPOSITIONS FORMED FROM HYDROPEROXIDE DERIVATIVES OF RUBBERY POLYMERS

BACKGROUND OF THE INVENTION

This invention relates to rubber modified polymeric compositions. Specifically, it relates to polymers modified with grafted rubbery polymers, said grafted rubbery polymers being formed from a process involving a hydroperoxidized rubbery polymer intermediate.

Rubber modified styrenic polymer compositions are well-known in the prior art. Exemplary of such compositions are compositions comprising polystyrene and a reinforcing, modifying rubbery polymer as well as compositions comprising styrene, acrylonitrile, and a reinforcing modifying rubbery polymer.

These rubber modified styrenic polymer compositions can be prepared in a variety of ways. Typically, one of two methods is used to produce such compositions. One method involves first producing a styrenic polymer (homopolymer or interpolymer), heat-plastifying said styrenic polymer, and blending said heat-plastifyed styrenic polymer with a heat-plastifyed grafted reinforcing rubbery polymer. Alternatively, the styrenic polymer can be polymerized in the presence of a preformed, ungrafted, rubbery polymer. For example, by a mass or bulk polymerization process, to obtain a rubber-modified styrenic polymer composition.

Prior art processes of preparing rubber modified styrenic polymer compositions have produced compositions having desirable physical properties. However, it is always desirable to improve the physical properties of such compositions. The compositions of the present invention possess physical properties superior to those compositions described by the prior art. Specifically, compositions according to the present invention possess an improved balance between izod impact strength and tensile strength.

Applicants have discovered that the present invention allows for the precise control of the average number of hydroperoxide groups per rubbery polymer chain, which in turn dictates the degree of grafting to the rubbery polymer. This precise control over the average number of hydroperoxide groups formed allows the compositions of the present invention to possess a specific izod impact/tensile strength balance thus allowing for production of compositions tailored for specific property needs.

SUMMARY OF THE INVENTION

The present invention concerns a rubber modified polymeric composition, the composition comprising:
(a) a generally rigid matrix phase; and
(b) a rubber modifying grafted rubbery polymer, said grafted rubbery polymer being formed by a process, the steps of the process comprising:
(1) forming a polymerizable mixture comprising one or more free-radically polymerizable monomers;
(2) dissolving a rubbery polymer having allylic hydrogen in the polymerizable mixture to form a rubber-containing polymerizable solution;
(3) adding to the rubber-containing polymerizable solution, a photosensitizing amount of a photo sensitizing agent;
(4) oxygenating the rubber-containing polymerizable solution;
(5) exposing the oxygenated rubber-containing polymerizable solution to electromagnetic radiation wherein triplet oxygen is converted to singlet oxygen and hydroperoxide derivatives of the rubbery polymer are formed;
(6) initiating polymerization of the rubber-containing polymerizable solution; and
(7) continuing polymerization of the rubber-containing polymerizable solution at least until the desired degree of grafting to the rubbery polymer is obtained.

DETAILED DESCRIPTION OF THE INVENTION

Figure 1:
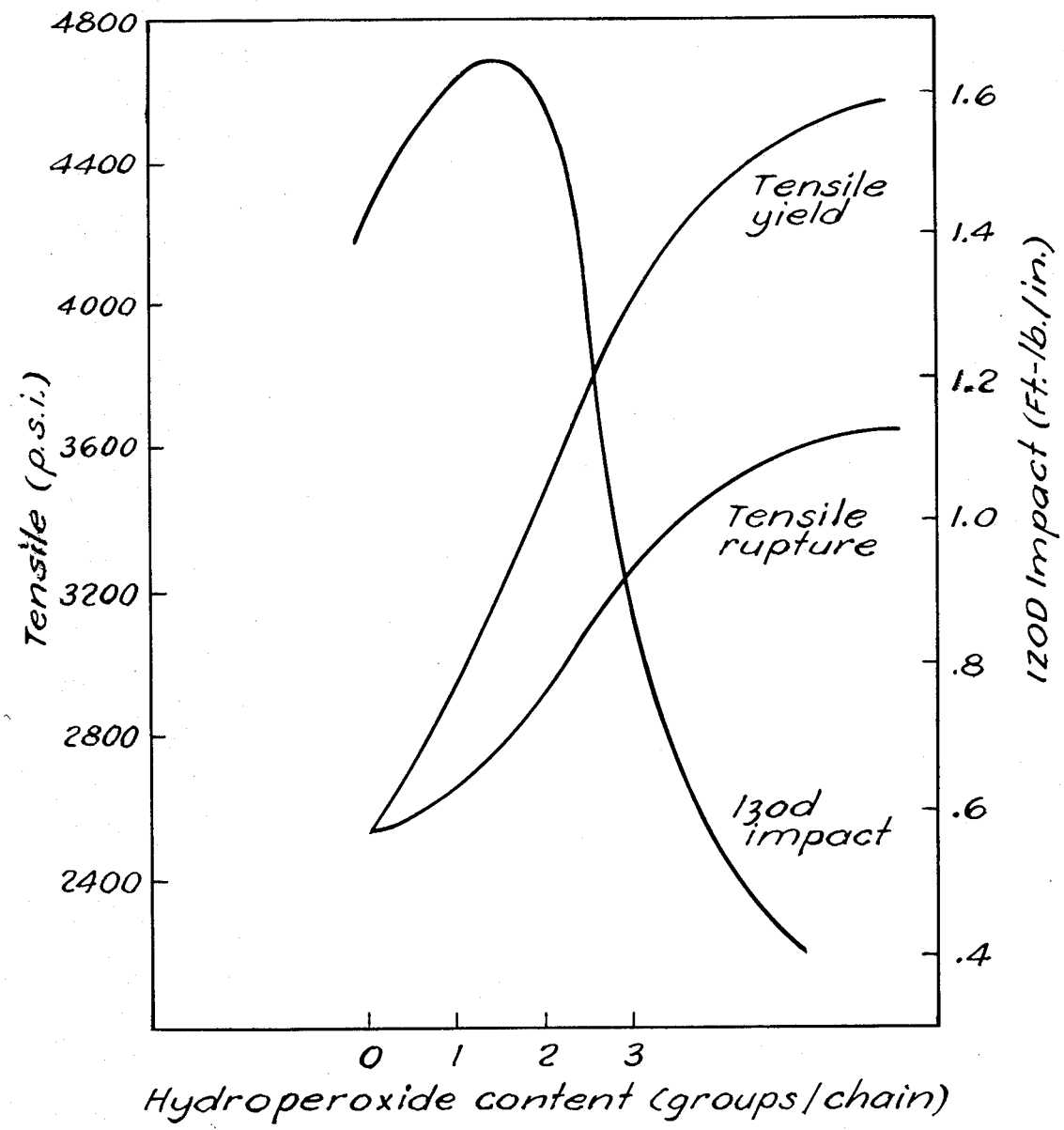

The compositions of the present invention are blended compositions comprising at least two different components. For clarity and ease of discussion, each of the two main components will be separately described.

The Matrix

The matrix of the present invention consists mainly of a homopolymer of a monovinylidene aromatic monomer or an interpolymer of a monovinylidene aromatic monomer and one or more monomers copolymerizable therewith.

When the matrix does not comprise 100 weight percent of the interpolymer, the balance of the matrix can comprise (1) additional polymeric materials, and/or (2) other filler-type material combined with the interpolymer of the matrix, e.g., plasticizers, lubricants, pigments, fillers, flame retardants, etc.

Exemplary of the monovinylidene aromatic monomers suitable for use in the claimed invention are styrene; alpha-alkyl monovinylidene monoaromatic compounds (e.g., alpha-methylstyrene, alpha-ethylstyrene, alphamethylvinyltoluene, alpha-methyl dialkylstyrenes, etc.); ring-substituted alkyl styrenes (e.g., ortho-, meta-, and paravinyl toluene, o-ethylstyrene, p-ethylstyrene, 2,4-dimethylstyrene, p-tertiarybutylstyrene, etc.); ring substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methyl styrene, 2,6-dichloro-4-methylstyrene, etc.); vinyl naphthalene; vinylanthracene; etc. The alkyl substituents generally have one to four carbon atoms and may include isopropyl and isobutyl groups. If desired, mixtures of one or more such monovinylidene aromatic monomers may be used.

Exemplary of the monomers copolymerizable with the monovinylidene aromatic monomers are the unsaturated nitriles. Suitable unsaturated nitriles are acrylonitrile, methacrylonitrile, ethacrylonitrile, fumaronitrile, and mixtures thereof. The unsaturated nitrile is generally present in the interpolymer of the matrix in an amount of from about 5 to about 50, preferably from about 15 to about 35 weight percent based on total weight of the interpolymer of the matrix.

Other monomers copolymerizable with the monovinylidene aromatic monomer and suitable for use in the interpolymer of the matrix are the conjugated 1,3-dienes (e.g., butadiene, isoprene, etc.); alpha- or beta-unsaturated monobasic acids and derivatives thereof (e.g.,acrylic acid, methyl acrylic acid, ethyl acrylate, butyl acrylate, 2-ethylhexyl acrylate, methacrylic acid, and the corresponding esters thereof such as methyl methacrylate, etc., acrylamide, methacrylamide); vinyl halides such as vinyl chloride, vinyl bromide, etc.; vinylidene chloride, vinylidene bromide, etc.; vinyl esters such as vinyl acetate, vinylproprionate, etc.; dialkyl maleates or fumarates such as dimethyl maleate, diethyl maleate, dibutyl maleate, the corresponding fumarates, etc.; divinylidene aromatic monomers such as divinyl benzene, etc.

The preferred monomers copolymerizable with the monovinylidene aromatic monomer of the interpolymer of the matrix are acyrlonitrile and methyl methacrylate.

Techniques suitable for producing the interpolymers of the matrix are well-known in the art. Examples of the known polymerization processes include mass, mass-solution, mass-suspension, suspension, and emulsion polymerization processes as well as other modifications and/or combinations of such processes. See, for example, U.S. Pat. Nos. 3,509,237; 3,928,494; 4,221,883; 4,239,863; 4,243,765; and 4,250,271; which are incorporated herein by reference and teach such processes.

The interpolymer of the matrix may be produced in a reaction separate from the production of the grafted rubbery polymer or, as is well-known in the art, all or part of the interpolymer of the matrix can be formed in the reaction used to produce the grafted rubbery polymer. In most instances, the reaction used to produce the grafted rubbery polymer inherently produces at least a small amount of the interpolymer of the matrix.

The Grafted Rubbery Polymer

The grafted rubbery polymer of the present invention comprises a rubbery polymer substrate, said rubbery polymer substrate having grafted thereto an interpolymer or homopolymer superstrate.

A wide variety of monomeric materials may be employed in forming the interpolymer superstrate. Suitable, are the monovinylidene aromatic monomers. Exemplary monovinylidene aromatic monomers include; styrene, ar-alkylstyrene, such as the o-, meta-, and p-methylstyrenes, 2,4-dimethylstyrene, the ar-ethylstyrenes, p-butylstyrene, etc.; alpha-alkyl monovinylidene monoaromatic compounds (e.g., alpha-methylstyrene, alpha-ethylstyrene, etc.); ring substituted alkyl/styrenes (e.g., ortho-, meta- and para-vinyl toluene; o-ethylstyrene; p-ethylstyrene; 2,4-dimethylstyrene; p-tertiary butylstyrene; etc.); ring-substituted halostyrenes (e.g., o-chlorostyrene, p-chlorostyrene, o-bromostyrene, 2,4dichlorostyrene, etc.); ring alkyl, ring-halo-substituted styrenes (e.g., 2-chloro-4-methylstyrene, 2,6-dichloro4-methylstyrene, etc.); vinyl naphthalene; vinyl anthracene, etc. The alkyl substituents generally have one to four carbon atoms and may include isopropyl and isobutyl groups. If desired, mixtures of one or more of such monovinylidene aromatic monomers may be used.

Also suitable for use in forming the interpolymer superstrate of the present invention are free-radically polymerizable olefinically unsaturated monomers. Examples of suitable free-radically polymerizable olefinic monomers include methyl methacrylate, ethyl methylacrylate, and the like; acrylonitrile, methacrylonitrile, ethacrylonitrile, and the like; and ethylene, propylene, and the like.

The interpolymer superstrate graft to the rubbery polymer substrate may have the same or a different composition than the interpolymer of the matrix. If the interpolymers have different compositions, they must be compatible. For the purposes of this invention, the interpolymer of the matrix and the interpolymer superstrate graft to the rubbery polymer substrate are considered compatible if, assuming different glass transition temperatures, a blend of the interpolymers would displace the glass transition temperature of the interpolymer of the matrix. Preferentially, a blend of the interpolymer superstrate graft to the rubbery polymer substrate and a compatible interpolymer of the matrix exhibits a single glass transition temperature.

Preferred monomers for use in forming the interpolymer superstrate graft to the rubbery polymer substrate are styrene, acrylonitrile and methyl methacrylate.

In one preferred embodiment of the present invention the interpolymer superstrate graft to the rubbery polymer substrate comprises styrene and acrylonitrile. In this preferred embodiment the weight ratio of styrene to acrylonitrile varies from about 99:1 to about 30:70.

In another preferred embodiment of the present invention the interpolymer superstrate grafted to the rubbery polymer substrate comprises 100 weight percent polystyrene.

The grafted rubbery polymers of the present invention are formed through a process wherein the monomers which will eventually be used to form the interpolymer superstrate graft to the rubbery polymer substrate are used to form a polymerizable mixture. A rubbery polymer is then dissolved in the polymerizable mixture to form a rubber-containing polymerizable solution. The rubbery polymer will form the rubbery polymer substrate of the grafted rubbery polymer of the present invention. The rubbery polymer possesses allylic hydrogen. The allylic hydrogen may be present either in the backbone, pendent to the backbone, or in both.

The term "rubbery polymer" is intended to encompass those polymers having a glass temperature of not higher than 0° C., preferably not higher than −20° C., as determined by ASTM D-756-52T. Suitable rubbers include the diene rubbers, the butyl rubbers, ethylene-propylene-diene monomer (EPDM) rubbers, and the silicone rubbers. Examples of suitable diene rubbers include mixtures of one or more conjugated 1,3-dienes, e.g., butadiene, isoprene, piperylene, chloroprene, etc. Suitable rubbers include homopolymers of conjugated 1,3-dienes and interpolymers of conjugated 1,3-dienes with one or more copolymerizable monoethylenically unsaturated monomers, e.g., copolymers of isobutylene and isoprene.

Examples of suitable copolymerizable monoethylenically unsaturated monomers include the monovinylidene aromatic hydrocarbons (e.g., styrene, aralkylstyrene, such as the o-, m- and p-methylstyrenes, 2,4-dimethylstyrene, the ar-ethylstyrenes, p-butylstyrene, etc.; and alpha-alkylstyrene, such as alpha-methylstyrene, alpha-ethylstyrene, alpha-methyl-p-methylstyrene, etc.; vinylnaphthalene, etc.); ar-halo-monovinylidene aromatic hydrocarbons (e.g., o-, m- and p-chlorostyrenes, 2,4-dibromostyrene, 2-methyl-4-chlorostyrene, etc.); acrylonitrile, methacrylonitrile, alkyl acrylates (e.g., methylacrylate, butyl acrylate, ethylhexyl acrylate, etc.), the corresponding alkyl methacrylates, acrylamides, (e.g., acrylamide, methylacrylamide, N-butylacrylamide, etc.); unsaturated ketones (e.g., vinyl methyl ketone, methyl isopropenyl ketone, etc.); alpha-olefins (e.g., ethylene, propylene, etc.); pyridines, vinyl esters (e.g., vinyl acetate, vinyl stearate, etc.); isobutylene rubbers, rubber polymers of ethylene, propylene, and the like.

In one preferred embodiment of the present invention, the rubbery polymer is a homopolymer of 1,3-butadiene.

In another preferred embodiment of the present invention the rubbery polymer is a terpolymer of a first α-olefin monomer, a second different α-olefin monomer and a non-conjugated diolefin monomer. The first α-olefin monomer has from 2 to 4 carbon atoms. The second α-olefin monomer has from 3 to 16 carbon atoms. The number of carbon atoms in the first α-olefin monomer is different than the number of carbon atoms present in the second α-olefin monomer. Exemplary of the terpolymers of this embodiment of the present invention are terpolymers of ethylene, propylene and a non-conjugated diolefin monomer (e.g., 5-ethylidene-2-norbornene). Such terpolymers are generally known in the art as EPDM rubbers.

Suitably, the rubbery polymer is present in an amount of from about 2 to about 30 percent by weight of the polymerizable mixture. Preferably, the rubbery polymer is present in an amount of from about 5 to about 20 percent by weight of the polymerizable mixture.

A photosensitizing agent is added to the rubber-containing polymerizable solution. The photosensitizing agent is added in an amount sufficient to photosensitize the rubber-containing polymerizable solution. Generally, the photosensitizing agent is added in an amount of from about $1 \times 10^{-4}$ to about $1 \times 10^{-1}$ weight percent based on total weight rubber-containing polymerizable solution weight.

A number of photosensitizing agents are suitable for use in the present invention. Exemplary of the suitable photosensitizing agents are methylene blue, Rose Bengal, Eosin Y, tetraphenylporphine and Erythrosin B.

In one preferred embodiment of the present invention, the rubbery polymer is a homopolymer of 1,3-butadiene, the preferred photosensitizing agent is methylene blue.

In another preferred embodiment of the present invention, the rubbery polymer is a terpolymer of a first and second α-olefin and a non-conjugated diolefin monomer, the preferred photosensitizing agent is methylene blue.

In many situations, depending on the composition of the rubber-containing polymerizable solution, the photosensitizing agent will not completely dissolve in the rubber-containing polymerizable solution. In these situations, hydroperoxidation of the rubbery polymers is substantially retarded.

It has been found desirable to employ a solubilizer for the photosensitizing agents in those situations in which the photosensitizing agent will not completely dissolve in the rubber-containing polymerizable solution. The more completely the photosensitizing agent is dissolved in the rubber-containing polymerizable solution the faster the hydroperoxidation reaction proceeds.

Suitable for use as a solubilizer is any compound which solubilizes the photosensitizing agent in the rubber-containing polymerizable solution without significantly interfering with the hydroperoxidation of the rubbery polymer.

Preferred solubilizers include, the following: methanol, ethanol, acrylonitrile, acetonitrile, ethyl acetate, ethylene glycol, o-dichlorobenzene, and dimethylsulfoxide.

The solubilizer is employed in an amount suitable to completely or nearly completely solubilize the photosensitizing agent in the rubber-containing polymerizable solution. Generally, the solubilizer is employed in an amount of from about 0.1 to about 20 weight percent based on total weight other rubber-containing polymerizable solution.

In one preferred embodiment of the present invention, the rubbery polymer is a homopolymer of a 1,3-butadiene, the photosensitizing agent is methylene blue and the solubilizer is methanol. Moreover, the methanol is present in an amount of from about 0.5 to about 5 weight percent based on total weight rubber-containing polymerizable solution.

In another preferred embodiment of the present invention, the rubbery polymer is a terpolymer of a first and second α-olefin and a non-conjugated diolefin monomer, the photosensitizing agent is methylene blue and the solubilizer is methanol.

The rubber-containing polymerizable solution is exposed to oxygen a sufficient length of time to oxygenate it. Suitably, at least 2 micromoles of oxygen are dissolved in the rubber-containing polymerizable solution for each gram of rubbery polymer present therein. Preferably, the amount of oxygen dissolved in the rubber-containing polymerizable solution is from about 2 to about 200 micromoles for each gram of rubbery polymer present therein.

The rubber-containing polymerizable solution, in the presence of oxygen and photosensitizer, is exposed to electromagnetic radiation, preferably to electromagnetic radiation having a wavelength between 3,000 and 8,000 Angstroms, for a length of time sufficient to convert triplet oxygen to singlet oxygen and form hydroperoxide derivatives of the rubber polymer. Most preferably, the electromagnetic radiation is visible light. The rubber-containing polymerizable solution is exposed to light for a length of time sufficient to form an average of from about 0.5 to about 4 hydroperoxide groups on each rubbery polymer chain.

The number of hydroperoxide groups on each rubbery polymer chain represents the average of the rubbery polymer chains present in the rubber-containing polymerizable solution. This number is determined by calculating the amount of hydroperoxide groups per gram of rubber, by the process set forth in Example 1, this number is then converted to the average number of hydroperoxide groups per rubbery polymer chain through the use of the number average molecular weight of the rubbery polymer.

The exposure to light may be a single exposure or a plurality of exposures. The total length of exposure to light is dependent on a variety of factors including: amount of oxygen present, intensity of the light, amount of photosensitizing agent present, and the number of hydroperoxide groups intended to be formed. The average number of hydroperoxide groups formed per rubbery polymer chain can be controlled most effectively by controlling the exposure to light and/or the amount of oxygen present in solution. The rubber-containing polymerizable solution is then polymerized.

Polymerization of the rubber-containing polymerizable solution is suitably initiated by cleaving the hydroperoxide groups present on the rubbery polymer chains. The hydroperoxide groups are cleaved between the oxygen atoms. Cleavage is suitably induced by heating to a temperature from about 80° C. to about 170° C. In one embodiment of the present invention cleavage of the hydroperoxide groups is induced by the presence of a redox initiation system, e.g., Ferrous Naphthanate, coupled with heating to a temperature of from about 40° C. to about 100° C.

Additionally, any free radical generating initiator or catalyst may be used in the polymerization of the rubber-containing polymerizable solution, including actinic radiation. Exemplary of suitable initiators and catalysts are azo initiators, di-tert-butyl peroxide, benzoyl peroxide, lauroyl peroxide, di-tert-butyl diperphthalate, tert-butyl-peracetate, tert-butyl perbenzoate, dicumyl peroxide, tert-butyl peroxide, isopropyl carbonate, 1,1-bis(t-butylperoxy) cyclohexane, 2,5-dimethyl-2,5-di(-tert-butylperoxy) hexane, 2,5-dimethyl-2,5-di(tert-butylperoxy)hexyne-3, tert-butylhydroperoxide, cumeme hydroperoxide, p-methane hydroperoxide, cyclopentane hydroperoxide, diisopropylbenzene hydroperoxide, p-tert-butyl cumene hydroperoxide, pinane hydroperoxide, 2,5-dimethyl-hexane-2,5-dihydroperoxide, etc., and mixtures thereof.

If desired, small amounts of antioxidants may be included in the rubber-containing polymerizable solution. Examples of suitable antioxidants include alkylated phenols, e.g., di-tert-butyl-p-cresol; and phosphites such as trinonyl phenyl phosphite. In general, the antioxidants may be added at any stage during the polymerization of the rubber-containing polymerizable solution. In some cases the antioxidants may interfere with the formation of the hydroperoxide derivatives. In those cases in which the antioxidant interferes with hydroperoxidation, the antioxidants must be added after formation of the hydroperoxide derivatives.

Optionally, a wide variety of diluents may be added to the rubber-containing polymerizable solution. Said optional diluent are generally present in an amount of less than 60 weight percent based on the total weight of the rubber containing polymerizable solution. Said diluents may be liquid materials which are generally nonreactive under polymerization conditions and act as a solvent for the polymer produced as well as for the starting monomer mixture. Examples of suitable diluents include ethylbenzene, toluene, benzene, xylenes, and aliphatic hydrocarbons such as hexane, heptane, etc.

Polymerization of the rubber-containing polymerizable solution is continued at least until the desired degree of grafting to the rubbery polymer is obtained. Typically, polymerization is allowed to continue until achieving at least about 20 weight percent conversion of monomer to polymer. Preferably, polymerization of the rubber containing polymerizable solution is allowed to continue until achieving at least about 40 weight percent conversion of monomer of polymer.

After achieving the desired degree of conversion of monomer to polymer, polymerization of the rubber containing polymerizable solution is stopped. The resultant polymer is then recovered.

The Blend

It is preferred that the matrix phase and the grafted rubbery copolymer be formed together through the above-described process used to form the grafted rubbery polymer. It is possible to blend the grafted rubbery polymer and rigid matrix phase produced therewith, with matrix phase produced in a separate process. Blending of the grafted rubbery polymer and rigid matrix phase produced therewith with separately-produced matrix phase can be done in a variety of well-known methods, such as extrusion blending or mill rolling. Whether or not blending occurs, compositions according to the present invention will have a rubbery polymer content of from about 2 to about 30, preferably from about 5 to about 20 weight percent based on total composition weight.

The present invention is further illustrated but not limited by the following examples. In the examples which follow, all weight percents are to within ±1.0 percent accuracy, therefore, the stated weight percents may not total 100.

EXAMPLE 1

A first feed stream was prepared 83.7 weight percent styrene; 10 weight percent ethylbenzene; and 5.2 weight percent Diene-55 ® a polybutadiene rubber commerically available from the Firestone Rubber Company. Forty pounds of the first feed stream were prepared.

A second stream was prepared containing 76.2 weight percent styrene; 10 weight ethylbenzene; 5.2 weight percent Diene-55 ®; 7.5 weight percent mineral oil; 600 ppm 1,1-bis(t-butylperoxy)cyclohexane; 0.75 weight percent dilaurylthiodipropionate; and 0.25 weight percent Topanol CA ® an antioxidant commercially available from Imperial Chemical Industries. Six thousand grams of the second feed stream were prepared.

The first feed stream was agitated and exposed to air for about 48 hours. At the end of this time period, a solution of 1 weight percent methanol and 10 ppm methylene blue, based on total weight of the first feed stream, was added to the first feed stream.

The first feed stream was exposed to visible light. The light had a wavelength of about 400 to 700 nanometers. The feed stream was passed through a ⅜ inch Pyrex ® heavy-walled glass tube while a high pressure 100 watt sodium vapor lamp was operating about three inches from the glass tube. A segment of tube approximately 11 inches in length was exposed to the visible light. The first feed stream was then passed through a carbon bed to remove the methylene blue.

Testing indicated a hydroperoxide group concentration of about 21.0 micromoles of hydroperoxide groups per gram of rubber or about 3.0 hydroperoxide groups per rubber polymer chain. The hydroperoxide concentration was determined for this and other examples by reacting the hydroperoxide derivative with triphenyl phosphine. An amount of triphenyl phosphine was dissolved with a known amount of rubber hydroperoxide and reacted with the hydroperoxide groups to form triphenyl phosphine oxide. The amount of triphenyl phosphine oxide produced was determined by gas chromatography. In this manner, the amount of hydroperoxide per gram of rubber was determined.

The first and second feed streams were then polymerized. The polymerization was carried out in a polymerization train comprising three stirred tube reactors, each reactor having a volume of 1160 milliliters. The first feed stream was contained in a feed tank which was charged into a first stirred tube reactor. The first feed stream was added to the first stirred tube reactor at a rate of 495 grams/hour. The first reactor was divided into three temperature control zones which had temperatures of 108° C., 113° C., and 121° C. The first stirred tube reactor discharged into a second stirred tube reactor. The second stirred tube reactor was divided into three temperature control zones which had temperatures of 130° C., 139° C., and 146° C. The second feed stream was added to the second stirred tube reactor at a rate of 115 grams/hour near the end of the first feed stream's residence time in the second reactor. The second stirred tube reactor discharged into a third stirred tube reactor. The third stirred tube reactor was divided into two temperature control zones which had temperatures of 152° C. and 164° C. The third stirred tube reactor discharged into a devolatilizer. The devolatilizer was maintained at a temperature of 230° C. and a vacuum of about 12 millimeters of mercury. The physical properties of the resultant polymer product are set forth in Table I.

FIG. 1 represents a graph constructed by repeating the procedure of Example 1 several times with the exception that the number of hydroperoxide groups per rubbery polymer chain was varied by varying the length of time the first feed stream was exposed to visible light.

FIG. 1 demonstrates the variation in balance between izod impact strength and tensile strength which can be achieved in compositions according to the present invention. This balance between izod impact strength and tensile strength is achieved by variation in the average number of hydroperoxide groups per rubbery polymer chain. It is the precise control of the average number of hydroperoxide groups per rubbery polymer chain obtainable through the present invention which allows for the tailoring of the balance between izod impact strength and tensile strength.

EXAMPLE 2

A first feed stream was prepared containing 83.7 weight percent styrene; 5 weight percent ethylbenzene; 5 weight percent Isopar C ®, a solvent containing about 85 percent isooctane the balance being various paraffinic hydrocarbons, commercially available from The Exxon Oil Company; and 5.25 weight percent EPsyn 40A ® a terpolymer rubber comprising ethylene, propylene, and 5-ethylidene-2-norbornene, commercially available from Copolymer Rubber and Chemical Corporation; Forty pounds of the first feed stream were prepared.

A second feed stream was prepared containing 74.0 weight percent styrene; 9.7 weight percent ethylbenzene; 2.9 weight percent Isopar C ®; 5.1 weight percent EPsyn 40A ®; 7.28 weight percent mineral oil; 583 ppm of 1,1-bis(t-butylperoxy)cyclohexane; 0.73 weight percent of dilaurylthiopropionate; and 0.24 weight percent of Topanol CA ®.

The first and second feed streams were agitated and exposed to air for about 48 hours. At the end of this time period a solution of 1 weight percent methanol and 10 ppm methylene blue, based on total weight of the first and second feed streams, respectively, was added to the first and second feed streams.

The first and second feed streams were separately exposed to visible light. The light had a wavelength of 400 to 700 nanometers. The feed streams were passed through a ⅜ inch Pyrex ® heavy-walled glass tube while a high pressure, 100 watt sodium vapor lamp was operating about three inches from the glass tube. A segment of tube approximately 1.5 inches in length was exposed to the visible light. The first and second reaction streams were then passed through a carbon bed to remove the methylene blue.

Testing indicated that the first feed stream had a hydroperoxide group concentration of about 19.0 micromoles of hydroperoxide groups per gram of rubber or about 1.5 hydroperoxide groups per rubber polymer chain. The second feed stream had a hydroperoxide group concentration of about 23.0 micromoles of hydroperoxide group per gram of rubber or about 1.8 hydroperoxide groups per rubber polymer chain.

The first and second feed streams were then polymerized. The polymerization was carried out in a polymerization train comprising three stirred tube reactors, each reactor having a volume of 1160 milliliters. The first feed stream was contained in a feed tank which discharged into a first stirred tube reactor. The first feed stream was added to the first stirred tube reactor at a rate of 447 grams/hour. The first reactor was divided into three temperature control zones which had temperatures of 110° C., 114° C. and 122° C. The first stirred tube reactor discharged into a second stirred tube reactor. The second stirred tube reactor was divided into three temperature control zones which had temperatures of 132° C., 140° C. and 146° C. The second feed stream was added to the second stirred tube reactor at a rate of 105 grams/hour near the end of the first feed stream's residence time in the second reactor. The second stirred tube reactor discharged into a third stirred tube reactor. The third stirred tube reactor was divided into two temperature control zones which had temperatures of 154° C. and 168° C. The third stirred tube reactor discharged into a devolatilizer. The devolatilizer was maintained at a temperature of 230° C. and a vacuum of about 13.5 millimeters of mercury. The physical properties of the resultant polymer product are set forth in Table I.

EXAMPLE 3

A first feed stream was prepared containing 52.3 weight percent styrene; 19.7 weight percent ethyl benzene; 18.7 weight percent acrylonitrile; 8.4 weight percent Diene-55 ®; and 250 ppm normal dodecylmercaptan.

A second feed stream was prepared containing 97.7 weight percent ethylbenzene; 1.3 weight percent Irganox 1076 ® an antioxidant commercially available from the Ciba-Geigy Corporation; and 1.0 weight percent normal dodecylmercaptan. The first feed stream was agitated and exposed to air for about 16 hours. At the end of this time period, 0.86 weight percent of a photosensitizing solution was added to the first feed stream.

The photosensitizing solution comprised 0.1 weight percent methylene blue and 99.9 weight percent methanol.

Approximately four hours after the addition of the photosensitizing agent to the first feed stream, the first feed stream was exposed to visible light. The light had a wavelength of about 400 to about 700 nanometers. The feedstream was passed through a ⅜ inch Pyrex ® heavy-walled glass tube while a high pressure 400 watt sodium vapor lamp was operating about three inches from the glass tube. A segment of tube approximately 13 inches in length was exposed to the visible light. The first feed stream was then passed through a carbon bed to remove the methylene blue.

Testing indicated a hydroperoxide group concentration of from about 8.2 to about 10.6 micromoles of hydroperoxide groups per gram of rubber or about 1.2 to about 1.5 hydroperoxide groups per rubber polymer chain.

The first and second feed streams were then polymerized. The polymerization was carried out in a polymerization train comprising three stirred tube reactors, each reactor having a volume of 1350 milliliters. The first feed stream was contained in a feed tank which discharged into a first stirred tube reactor. The first feed stream was added to the first stirred tube reactor at a rate of 420 grams/hour. The first reactor was divided into three temperature control zones which had temperatures of 113.5° C., 116° C. and 118.5° C. The first stirred tube reactor discharged into a second stirred tube reactor. The second stirred tube reactor was divided into two temperature control zones which had temperatures of 128° C. and 134° C. The second feed stream was added to the second stirred tube reactor at a rate of 33 grams/hour. The second stirred tube reactor discharged into a third stirred tube reactor. The third stirred tube reactor was divided into two temperature control zones having temperatures of 144° C. and 156° C. The third stirred tube reactor discharged into a devolatilizer. The devolatilizer was maintained at a temperature of 230° C. and a vacuum of about 30 millimeters of mercury. The physical properties of the resultant polymer product are set forth in Table I.

EXAMPLE 4

A first feed stream was prepared containing 53.9 weight percent styrene; 20 weight percent ethylbenzene; 18 weight percent acrylonitrile; 7.9 weight percent Diene-55 ®; 0.01 weight percent normal dodecylmercaptan; and 0.12 weight percent 1,1-bis(t-butylperoxy)cyclohexane.

A second feed stream was prepared containing 69.3 weight percent ethylbenzene; 7.4 weight percent acrylonitrile; 22.3 weight percent styrene; and 1.0 weight percent normal dodecylmercaptan. The first feed stream was agitated and exposed to air for about 30 hours. At the end of this time period, 0.86 weight percent of a photosensitizing solution was added to the first feed stream. The photosensitizing solution contained 0.1 weight percent methylene blue and 99.9 weight percent methanol.

The first feed stream was exposed to visible light. The light had a wavelength of about 400 to 700 nanometers. The feed stream was passed through a ⅜ inch Pyrex ® heavy-walled glass tube while a high pressure 100 watt sodium vapor lamp was operating about three inches from the glass tube. A segment approximately 13 inches in length was exposed to the visible light. The first feed stream was then passed through a carbon bed to remove the methylene blue.

Testing indicated a hydroperoxide group concentration of about 8.3 micromoles of hydroperoxide groups per gram of rubber or about 1.2 hydroperoxide groups per rubber polymer chain.

The first and second feed streams were then polymerized. The polymerization was carried out in a polymerization train comprising three stirred tube reactors, each reactor having a volume of 1350 milliliters. The first feed stream was contained in a feed tank which discharged into a first stirred tube reactor. The first feed stream was added to the first stirred tube reactor at a rate of 431 grams/hour. The first reactor was divided into three temperature control zones which had temperatures of 100° C., 101° C. and 105° C. The first stirred tube reactor discharged into a second stirred tube reactor. The second stirred tube reactor was divided into two temperature control zones which had temperatures of 114° C. and 122° C. The second feed stream was added to the second stirred tube reactor at a rate of 46 grams/hour. The second stirred tube reactor discharged into a third stirred tube reactor. The third stirred tube reactor was divided into two temperature control zones having temperatures of 135° C. and 155° C. The third stirred tube reactor discharged into a devolatilizer. The devolatilizer was maintained at a temperature of 230° C. and a vacuum of about 35 millimeters of mercury. The physical properties of the resultant polymer product are set forth in Table I.

EXAMPLE 5

A first feed stream was prepared containing 61.0 weight percent styrene; 6.6 weight percent acrylonitrile; 22.3 weight percent Isopar C ®; and 9.1 weight percent EPsyn 55 ® a terpolymer rubber comprising ethylene, propylene, and 5-ethylidene-2-norbornene, commerically available from the Copolymer Rubber and Chemical Corporation.

A second feed stream was prepared containing 37.6 weight percent acrylonitrile; 61.4 weight percent cyclohexanone; 0.53 weight percent Irganox 1076 ®; 0.056 weight percent of 1,1-bis(t-butylperoxy)cyclohexane; and 0.37 weight percent normal dodecylmercaptan.

The first feed stream was agitated and exposed to air for about 16 hours. At the end of this time period, 1 weight percent of a photosensitizing solution was added to the first feed stream. The photosensitizing solution contained 0.1 weight percent methylene blue and 99.9 weight percent methanol.

The first feed stream was exposed to visible light. The light had a wavelength of about 400 to 700 nanometers. The feed stream was passed through a ⅜ inch Pyrex ® heavy-walled glass tube while a high pressure 100 watt sodium vapor lamp was operating about 3 inches from the glass tube. A segment of tube approximately 13 inches in length was exposed to the visible light. The first feed stream was then passed through a carbon bed to remove the methylene blue.

Testing indicated a hydroperoxide group concentration of about 10.0 micromoles of hydroperoxide groups per gram of rubber or about 0.9 hydroperoxide groups per rubber polymer chain.

The first and second feed streams were then polymerized. The polymerization was carried out in a polymerization train comprising three stirred tube reactors, each reactor having a volume of 1350 milliliters. The first feed stream was contained in a feed tank which discharged into a first stirred tube reactor. The first feed stream was added to the first stirred tube reactor at a rate of 400 grams/hour. The first reactor was divided into three temperature control zones which had temperatures of 97° C., 105° C. and 111° C. The first stirred tube reactor discharged into a second stirred tube reactor. The second stirred tube reactor was divided into two temperature control zones which had temperatures of 109° C. and 115° C. The second feed stream was added to the second stirred tube reactor at a rate of 146 grams/hour. The second stirred tube reactor discharged into a third stirred tube reactor. The third stirred tube reactor had two temperature control zones which had temperatures of 135° C. and 145° C. The third stirred tube reactor discharged into a devolatilizer. The devolatilizer was maintained at a temperature of 235° C. and a vacuum of about 45 millimeters of mercury. The physical properties of the resultant polymer product are set forth in Table I.

TABLE I

| Example No. | Percent Rubber | Melt Flow Rate[1] (g/10 min) | Vicat[2] (°F.) | Izod[3] (ft lb/ inch notch) | Tmod[4] × $10^5$ psi | Ty[5] (psi) | Tr[6] (psi) | % E[7] | Rubber Particle Size[8] (Micron) (Volume Average Diameter) |
|---|---|---|---|---|---|---|---|---|---|
| 1 | 6.8 | 3.0 | 218.8 | 1.37 | 3.47 | 3699 | 3116 | 31.9 | 1.92 |
| 2 | 6.5 | 4.0 | 218.0 | 0.94 | 3.39 | 3979 | 2845 | 24.9 | * |
| 3 | 12.5 | 2.29 | 232.8 | 3.35 | 2.8 | 4195 | 4275 | 50.4 | * |
| 4 | 11.8 | 1.9 | * | 4.1 | 2.7 | 6400 | 5000 | 10.7 | 0.91 |
| 5 | 14.0 | 4.1 | * | 2.7 | * | 6200 | 5700 | 5.6 | 0.81 |

Notes:
*Data not available.
[1] Melt Flow Rate in grams per 10 minutes as measured by ASTM D-1238, Condition 200/5.0 (ex. 1-2) Condition 230/3.8 (ex. 3-5).
[2] Vicat Heat Distortion in degrees Fahrenheit as measured by ASTM D-1525.
[3] Izod Impact Strength in foot pounds per inch of notch as measured by ASTM D-256.
[4] Tensile Modulus in pounds per square inch as measured by ASTM D-638.
[5] Tensile Yield in pounds per square inch as measured by ASTM D-638.
[6] Tensile Rupture in pounds per square inch as measured by ASTM D-638.
[7] Percent Elongation as measured by ASTM D-638.
[8] Rubber Particle in microns, volume average diameter.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the following claims.

What is claimed is:

1. A rubber modified polymeric composition the composition comprising:
   (a) a generally rigid matrix phase of a homopolymer of a monovinylidene aromatic monomer or an interpolymer of a monovinylidene aromatic monomer and one or more monomers copolymerizable therewith; and
   (b) a rubber modifying grafted rubbery copolymer said grafted rubbery copolymer being formed by a process, the steps of the process comprising:
      (1) forming a polymerizable mixture comprising one or more free-radically polymerizable monomers;
      (2) dissolving a rubbery polymer having allylic hydrogen in the polymerizable mixture to form a rubber-containing polymerizable solution;
      (3) adding to the rubber-containing polymerizable solution, a photosensitizing amount of a photosensitizing agent;
      (4) oxygenating the rubber-containing polymerizable solution;
      (5) exposing the oxygenated rubber-containing polymerizable solution to electromagnetic radiation wherein triplet oxygen is converted to singlet oxygen, and an average of from about 0.5 to about 4 hydroperoxide derivatives of the rubbery polymers are formed on each rubbery polymer chain;
      (6) initiating polymerization of the rubber-containing polymerizable solution; and
      (7) continuing polymerization of the rubber-containing polymerizable solution at least until the desired degree of grafting to the rubbery polymer is obtained; wherein the rubber-modified polymeric composition has a rubbery polymer content of from about 2 to about 30 weight percent based on total composition weight.

2. The composition of claim 1 wherein the matrix phase comprises polystrene.

3. The composition of claim 1 wherein the matrix phase comprises an interpolymer of a major portion of styrene and a minor portion of one or more monomers copolymerizable therewith.

4. The composition of claim 1 wherein the matrix phase comprises a copolymer of styrene and acrylonitrile.

5. The composition of claim 1 wherein the grafted rubbery polymer is a grafted diene rubber.

6. The composition of claim 5 wherein the diene rubber is polybutadiene.

7. The composition of claim 1 wherein the grafted rubbery polymer is a grafted block copolymer of styrene and butadiene.

8. The composition of claim 1 wherein the grafted rubbery polymer is a grafted terpolymer of a first α-olefin monomer, a second different α-olefin monomer, and a non-conjugated diolefin monomer, said first α-olefin monomer having from 2 to 4 carbon atoms, said second α-olefin monomer having from 3 to 16 carbon atoms and being different than the first α-olefin monomer.

9. The composition of claim 8 wherein the first α-olefin monomer is ethylene.

10. The composition of claim 8 wherein the second α-olefin monomer is propylene.

11. The composition of claim 8 wherein the non-conjugated diolefin monomer is 5-ethylidene-2-norbornene.

12. The composition of claim 1 wherein there is added to the rubber-containing polymerizable solution, an amount of solubilizer sufficient to solubilize the photosensitizing agent in the rubber-containing polymerizable solution.

* * * * *